US012167514B2

(12) United States Patent
Alexander

(10) Patent No.: US 12,167,514 B2

(45) **Date of Patent: *Dec. 10, 2024**

(54) LIGHTING CONNECTIVITY MODULE

(71) Applicant: Feit Electric Company, Inc., Pico Rivera, CA (US)

(72) Inventor: Marc Alexander, San Francisco, CA (US)

(73) Assignee: Feit Electric Company, Inc., Pico Rivera, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/862,386

(22) Filed: Jul. 11, 2022

(65) Prior Publication Data

US 2022/0353968 A1 Nov. 3, 2022

Related U.S. Application Data

(63) Continuation of application No. 16/990,132, filed on Aug. 11, 2020, now abandoned, which is a continuation of application No. 16/446,899, filed on Jun. 20, 2019, now Pat. No. 10,805,999, which is a continuation of application No. 15/915,352, filed on Mar. 8, 2018, now Pat. No. 10,375,804, which is a continuation of application No. 14/937,774, filed on Nov. 10, 2015, now Pat. No. 9,949,348.

(Continued)

(51) Int. Cl.

| | |
|---|---|
| ***H05B 45/20*** | (2020.01) |
| ***F21K 9/232*** | (2016.01) |
| ***F21V 23/04*** | (2006.01) |
| ***H05B 45/30*** | (2020.01) |
| ***H05B 47/19*** | (2020.01) |

(52) U.S. Cl.

CPC ............. *H05B 45/20* (2020.01); *H05B 47/19* (2020.01); *F21K 9/232* (2016.08); *F21V 23/0435* (2013.01); *H05B 45/30* (2020.01)

(58) Field of Classification Search

CPC ........ H05B 45/20; H05B 47/19; H05B 45/30; F21K 9/232; F21V 23/0435

See application file for complete search history.

(56) References Cited

U.S. PATENT DOCUMENTS 8,669,716 B2 3/2014 Recker et al.
8,742,694 B2 6/2014 Bora et al.

(Continued)

*Primary Examiner* — Daniel D Chang

(74) *Attorney, Agent, or Firm* — Alston & Bird LLP

(57) ABSTRACT

A lighting module, including: a baseboard configured to receive a user signal indicating a user lighting preference; a communication submodule configured to receive the user signal and convert the user signal to machine readable data indicating the user lighting preference; a control submodule communicably coupled to the wireless communication submodule for receiving the machine readable data, wherein the microcontroller submodule comprises: memory configured to store a lighting parameter provided by a provider, and a processor configured to generate lighting driver instructions based on the user lighting preference and the lighting parameter; and a lighting mode output submodule configured to output the lighting driver instructions to a lighting driver module of a lighting assembly for controlling light emitting elements of the lighting assembly.

19 Claims, 8 Drawing Sheets

Related U.S. Application Data

(60) Provisional application No. 62/077,812, filed on Nov. 10, 2014.

(56) References Cited

U.S. PATENT DOCUMENTS

| | | | | |
|---|---|---|---|---|
| 8,987,996 | B2 * | 3/2015 | Chang | H05B 45/20 315/210 |
| 9,198,262 | B1 | 11/2015 | Bosua et al. | |
| 9,404,624 | B2 | 8/2016 | Chung | |
| 9,510,426 | B2 | 11/2016 | Chemel et al. | |
| 9,851,057 | B2 | 12/2017 | Cho et al. | |
| 9,949,348 | B2 | 4/2018 | Alexander | |
| 10,375,804 | B2 | 8/2019 | Alexander | |
| 10,805,999 | B2 | 10/2020 | Alexander | |
| 2007/0007898 | A1 | 1/2007 | Bruning | |
| 2009/0059603 | A1 | 3/2009 | Recker et al. | |
| 2010/0295468 | A1 * | 11/2010 | Pedersen | F21S 10/02 362/218 |
| 2012/0069545 | A1 | 3/2012 | Choi et al. | |
| 2012/0274208 | A1 | 11/2012 | Chen et al. | |
| 2012/0293652 | A1 * | 11/2012 | Farmer | F21K 9/232 315/50 |
| 2013/0249392 | A1 | 9/2013 | Kim | |
| 2013/0264943 | A1 | 10/2013 | Bora et al. | |
| 2013/0285544 | A1 | 10/2013 | Molezion | |
| 2013/0293112 | A1 * | 11/2013 | Reed | H05B 47/105 315/297 |
| 2014/0021862 | A1 | 1/2014 | Chung | |
| 2014/0265900 | A1 | 9/2014 | Sadwick et al. | |
| 2014/0292208 | A1 | 10/2014 | Chemel et al. | |
| 2014/0300294 | A1 | 10/2014 | Zampini et al. | |
| 2015/0103515 | A1 | 4/2015 | Bosua et al. | |
| 2015/0211687 | A1 | 7/2015 | Chung | |
| 2015/0327349 | A1 | 11/2015 | Lee et al. | |
| 2015/0338074 | A1 | 11/2015 | Chen et al. | |
| 2015/0345764 | A1 * | 12/2015 | Hussey | H05B 33/00 362/235 |
| 2016/0061396 | A1 | 3/2016 | Bosua et al. | |
| 2020/0374997 | A1 | 11/2020 | Alexander | |

* cited by examiner

LIGHTING CONNECTIVITY MODULE

CROSS-REFERENCE TO RELATED APPLICATIONS

This application is a continuation of U.S. application Ser. No. 16/990,132, filed 11 Aug. 2020, which is a continuation of U.S. application Ser. No. 16/446,899, filed 20 Jun. 2019, which is a continuation of U.S. application Ser. No. 15/915,352 filed 8 Mar. 2018 which is a continuation of U.S. application Ser. No. 14/937,774, filed 10 Nov. 2015, which claims the benefit of U.S. Provisional Application No. 62/077,812 filed 10 Nov. 2014, each of which is incorporated in its entirety by this reference.

TECHNICAL FIELD

This invention relates generally to the lighting systems field, and more specifically to a fully integrated lighting connectivity module.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
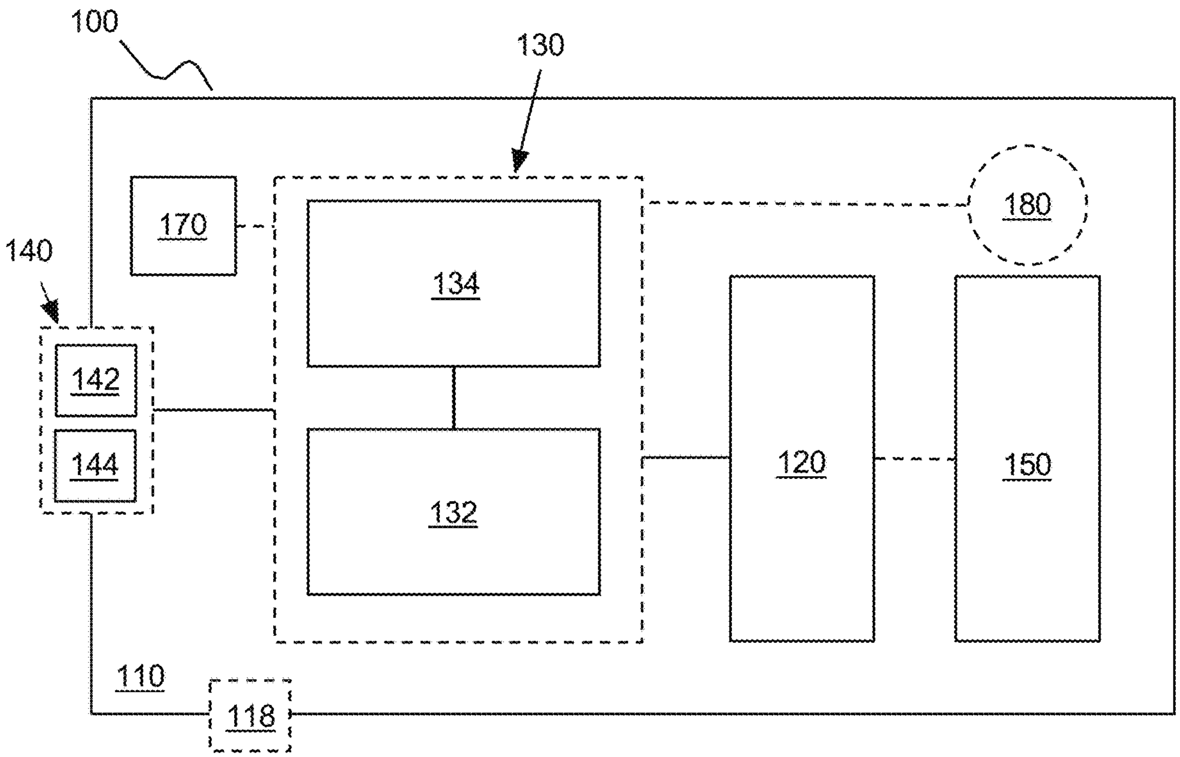
FIG. 1 is a schematic representation of the lighting connectivity module.

As shown in FIG. 1, a lighting connectivity module (LCM) 100 includes a baseboard 110, a communication submodule 120 including a storage component 132 and a processor 134, and a lighting mode output submodule 140. The LCM 100 can additionally include an antenna 150, a housing 160, a power storage system 170 and/or a set of sensors 180. However, the LCM 100 can additionally or alternatively include any other suitable components.

Figure 2:
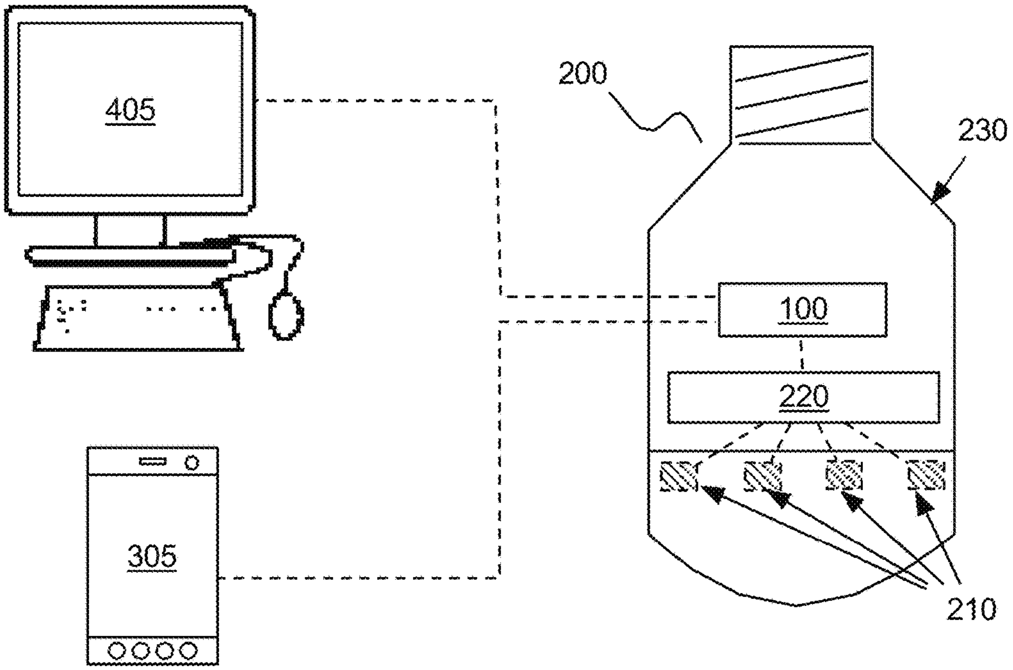
FIG. 2 is a schematic representation of a first variation of the lighting connectivity module.
Figure 11:
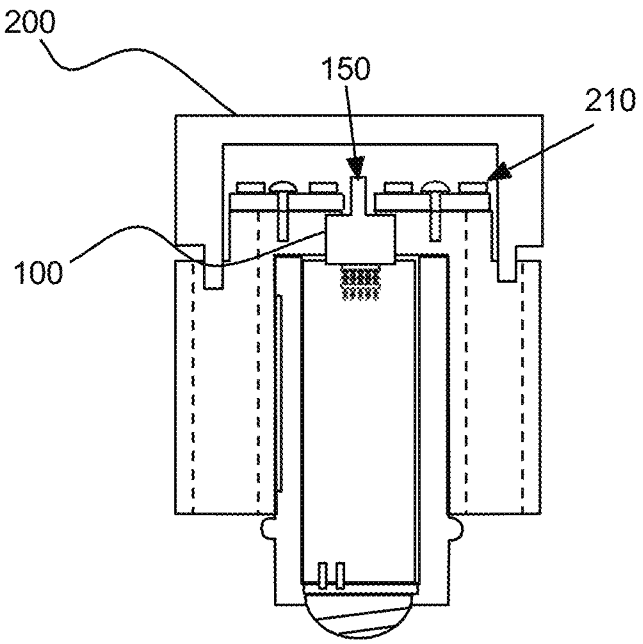
FIG. 11 is a schematic representation of a fourth variation of the lighting connectivity module.

The LCM 100 functions to provide connectivity between a user 300 and a lighting driver module 220 controlling a lighting assembly 200. The LCM 100 is preferably electrically connectable to a primary power source, such as a power grid, wherein the LCM 100 preferably receives and powers the LCM components based on power from the primary power source. As shown in FIG. 2, the LCM 100 is preferably communicably coupled to a lighting assembly 200. The lighting assembly 200 can include a shell 230, an end cap 228, an antenna aperture 229, an inner wall 221, a diffuser, sensors, a substrate 250, a lighting driver module 220 (e.g., LED driver, control system for light emitting elements 210, etc.), light emitting elements 210 (e.g., LEDs, LED strings, fluorescent lights, incandescent lights, etc.), and/or any other suitable component. Examples of sensors include position sensors (e.g., accelerometer, gyroscope, etc.), location sensors (e.g., GPS, cell tower triangulation sensors, triangulation system, trilateration system, etc.), temperature sensors, pressure sensors, light sensors (e.g., camera, CCD, IR sensor, etc.), current sensors, proximity sensors, clocks, touch sensors, vibration sensors, and/or any other suitable sensor. As shown in FIGS. 2 and 11, the LCM 100 can be physically integrated with the lighting assembly 200, such as being electrically connected to a lighting driver module 220 within the shell 230 of the lighting assembly 200. However, the LCM 100 can be coupled to the lighting assembly 200 in any suitable manner. The LCM 100 can control the lighting assembly 200 by generating lighting driver instructions 135 for the lighting driver module 220 to implement with the light emitting elements 210 of the lighting assembly 200, but can otherwise control lighting assembly operation. The LCM 100 preferably generates the lighting driver instructions 135 based on user preferences 310 (e.g., lighting preferences 310, power preferences 310, timing preferences 310, event preferences 310, etc.) and provider configuration parameters 410 provided by a provider (e.g. lighting parameters 410, power provision parameters 410, etc.), but can alternatively generate the lighting driver instructions based on any other suitable set of information. The user preferences 310 can be individual user preferences, global user preferences, or user preferences for any other suitable set of users 300. The user preferences 310 can be stored in association with a user account (e.g., by a remote computing system), stored by the user device 305, stored by the LCM 100, stored by the lighting assembly 200, or be stored in any other suitable manner. However, the LCM 100 can additionally or alternatively perform any other suitable function in relation to the user 300, the provider 400, and/or the lighting assembly 200. Multiple LCMs 100 can be implemented with multiple sets of light emitting elements 210 or lighting driver modules 229 of a single lighting assembly 200. Alternatively, multiple LCMs 100 can be implemented with multiple lighting assemblies 200. However, any number of LCMs 100 can be used with any number of lighting assemblies 200. However, the LCM 100 can be used as the processing module for any other suitable application, including outlets, switches, lighting fixtures, phones, computing systems, or in any other suitable application.

1. Benefits.

The LCM 100 confers several benefits over conventional lighting connectivity systems and lighting assemblies 200 generally. First, through the control submodule 130 and the communication submodule 120, the LCM 100 can aid providers in enabling wireless communication between provider lighting products and user devices 305 such as smartphones. Second, the LCM 100 can be integrated with firmware modifiable by providers for configuring lighting and power parameters 410 for the LCM 100 as well as lighting products operating with the LCM 100. In particular, the firmware can be modified at the point of manufacture (e.g., flashed onto the LCM storage), dynamically modified after sale (e.g., through a wireless update), or be modified in any suitable manner. Third, the LCM 100 provides a low-power solution for connecting lighting assemblies 200 to wireless networks, for example, in the home or office.

2. System.

2.1 Baseboard.

As shown in FIG. 1, the baseboard 110 functions to provide a base of support and electrical connectivity for the LCM components. The baseboard 110 can additionally function to direct power to the LCM components from a power supply (e.g., lightbulb base or power storage system 170). Preferably, the baseboard 110 is a printed circuit board (PCB), but can alternatively be any other suitable substrate that mechanically supports and electrically connects the LCM components. The baseboard 110 can additionally or alternatively include mounting points, such as holes (e.g., for screws), grooves, hooks, or any other suitable mounting point. Alternatively, the baseboard 110 can be substantially continuous or have any other suitable configuration. Preferably, the baseboard 110 acts as the base for each of the LCM components. Alternatively, different baseboards 110 can be used to provide mounting points for the different LCM components. However, the baseboard 110 can act as the base for any number and/or combination of components. The baseboard 110 preferably includes a first region 111 adjacent a second region 112, but can include any number of regions in any type of orientation and/or positioning with respect to other regions.

Figure 3:
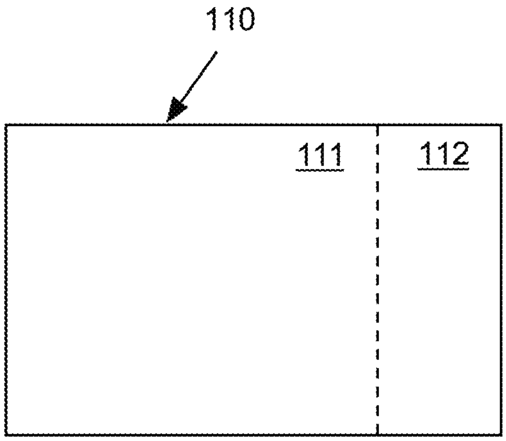
FIGS. 3, 4, and 5 are schematic representations of a first, second, and third variation of the baseboard, respectively.
Figure 4:
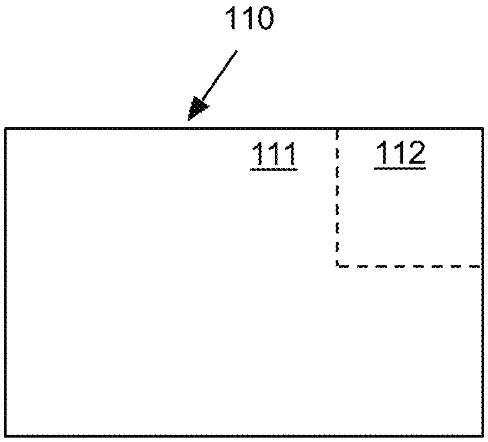
Figure 5:
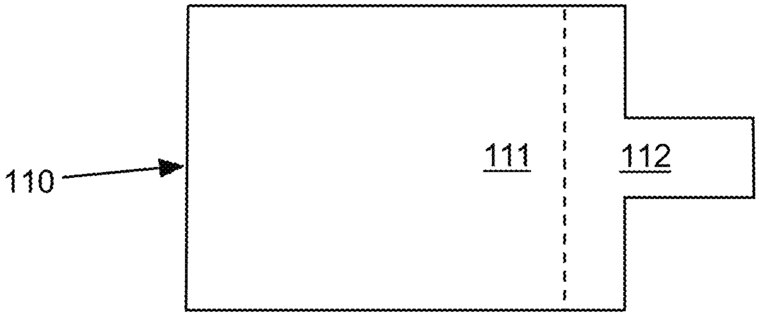

In a first variation, as shown in FIG. 3, the first region 111 and the second region 112 are aligned along the longitudinal axis 115 of the baseboard 110. The second region longitudinal axis of the second region 112 (i.e., the axis corresponding to the length or longest side) can be arranged perpendicular, parallel, at any suitable angle, or otherwise arranged relative to a baseboard longitudinal axis 115 of the baseboard 110. The longitudinal axis of the first region (first region longitudinal axis) can be perpendicular, parallel, arranged at any suitable angle, or otherwise arranged relative to the longitudinal axis of the baseboard. For example, the second region 112 can interface with the first region 111 at only one side of the first region 111, where the first region 111 and the second region 112 are aligned along the baseboard longitudinal axis 115 of the baseboard 110. In a second variation, as shown in FIG. 5, the second region 112 is adjacent the first region 111, and the second region 112 can include a protrusion. The protrusion can be arranged relative the remainder of the baseboard 110 with the protrusion central longitudinal axis aligned: coaxially with the baseboard central longitudinal axis 115, offset from the baseboard central longitudinal axis 115, at an angle to the baseboard central longitudinal axis 115, or in any other suitable orientation. In a third variation, as shown in FIG. 4, a second region longitudinal axis of the second region 112 is perpendicular to a baseboard longitudinal axis 115, where the first region 111 and the second region 112 are not aligned along the baseboard longitudinal axis 115 of the baseboard 110. For example, the second region 112 can interface with the first region 111 at two sides of the first region 111 (e.g., wherein the first region 111 is offset form the baseboard central longitudinal and/or lateral axis). In a fourth variation, the first region 111 can be coplanar with and surround the second region 112. In a sixth variation, the first region 111 can lie on a parallel plane to the second region 112 (e.g., be arranged parallel the second region). However, the first region 111 and second region 112 can be otherwise arranged.

Figure 12:
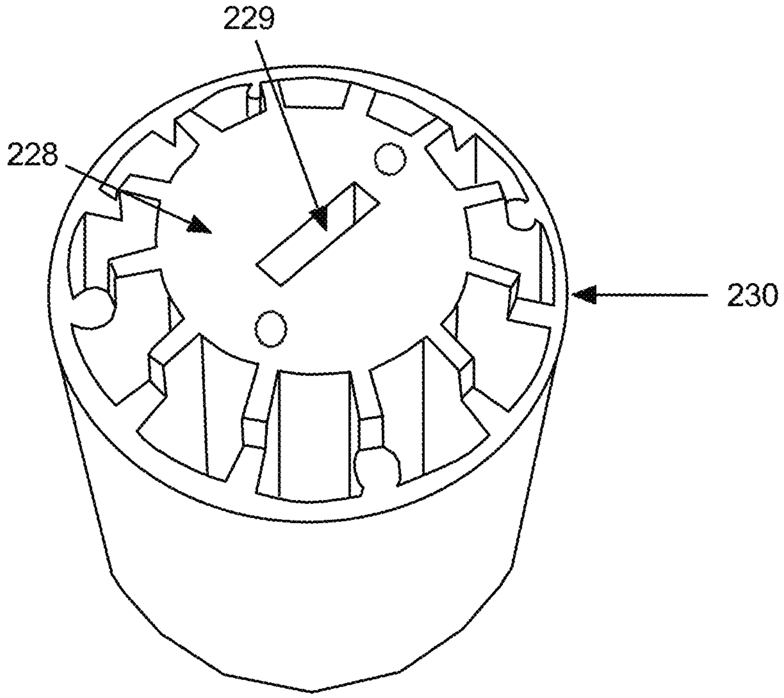
FIG. 12 is a schematic representation of a variation of the shell.
Figure 13:
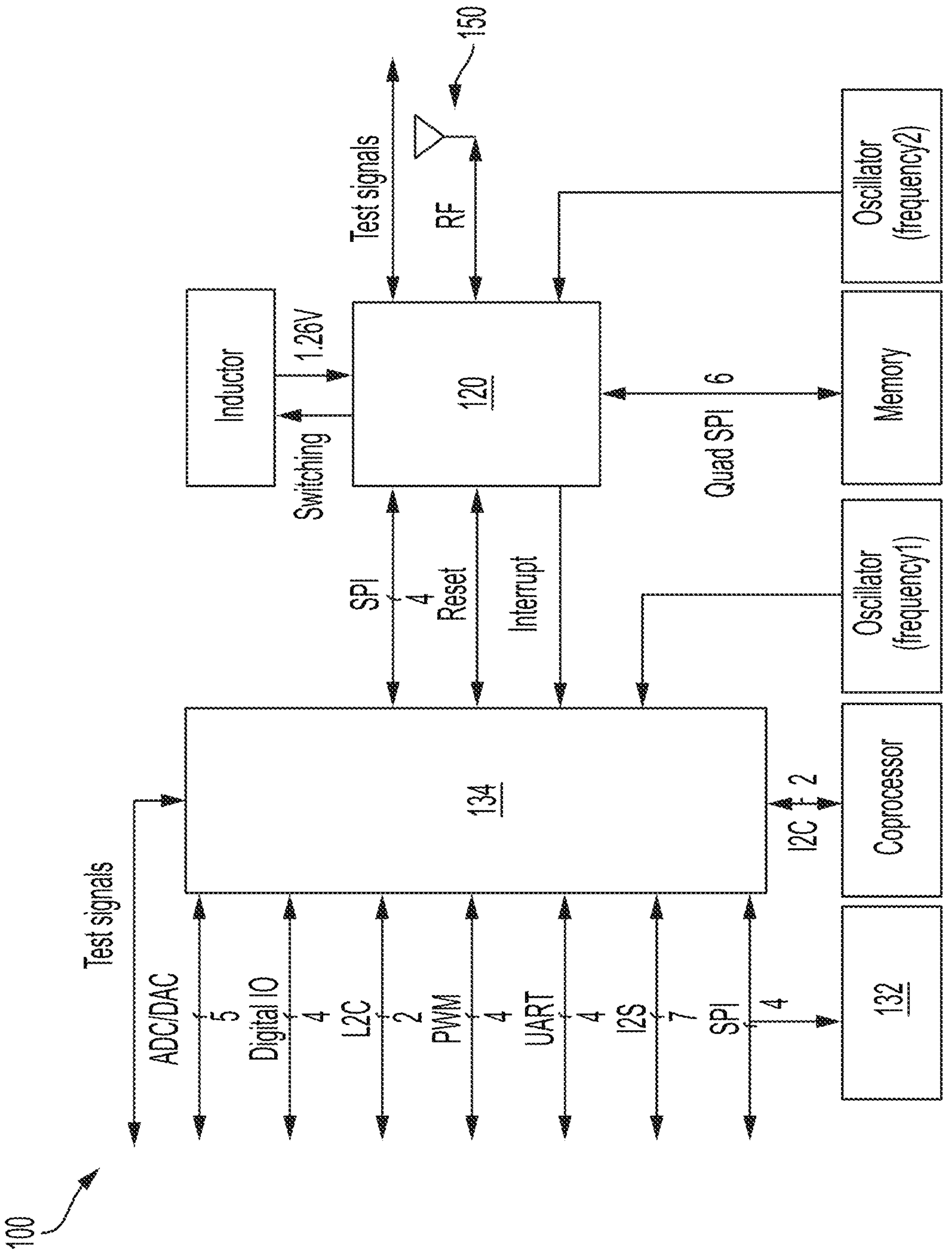
FIG. 13 is a schematic representation of a specific example of the LCM.
Figure 14:
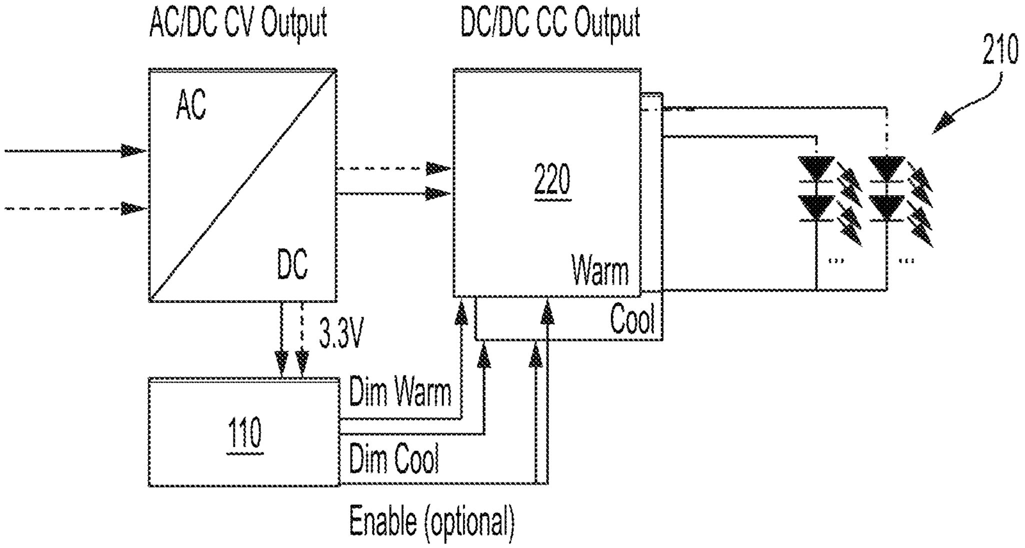
FIG. 14 is a schematic representation of a specific example of LCM use in a LED light bulb with multiple sets of individually indexed and controllable LEDs (e.g., a lightbulb with a set of independently controlled dimmable warm white LEDs and a set of independently controlled dimmable cool white LEDs).
Figure 15:
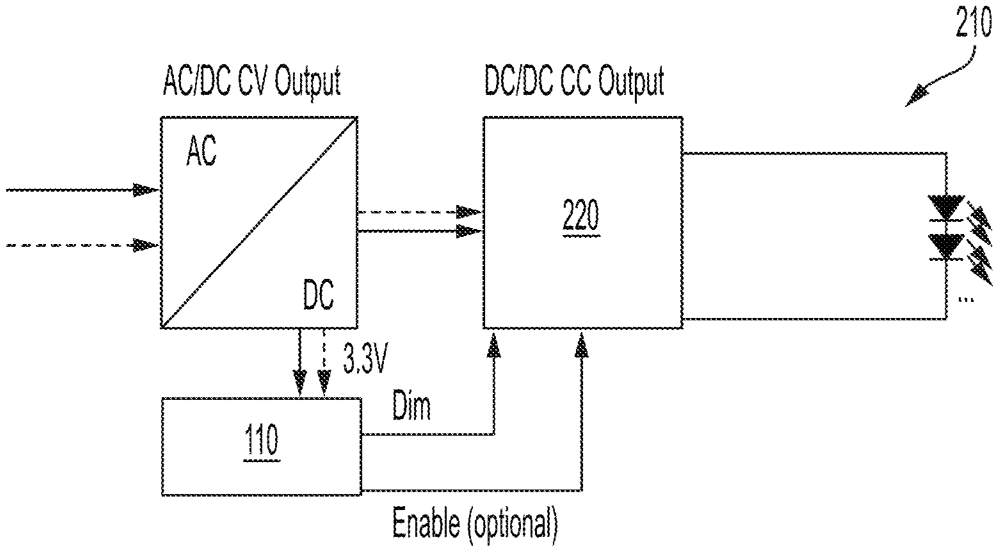
FIG. 15 is a schematic representation of a specific example of LCM use in a tunable color LED light bulb with a single set of individually indexed and controllable LEDs.

The shell 230 of the lighting assembly 200 can additionally define a baseboard mounting portion (example shown in FIG. 12). The baseboard mounting portion is preferably defined within a lumen defined between inner and outer walls, but can alternatively be defined within the inner lumen, defined external the outer wall, or defined in any other suitable position. The baseboard mounting point can be defined by a lack of fins, profiled fins (e.g., wherein the fins are profiled to provide a void for the baseboard), or be defined in any other suitable manner. The baseboard 110 can be mounted to the inner wall exterior surface, the outer wall interior surface, a broad face of a fin, an end of the inner wall, an end of the outer wall, an end of one or more fins, and/or to any other suitable surface. When the baseboard mounting portion is defined between the inner and outer walls, the shell 230 can additionally include an access point that enables user access to the baseboard 110. The access point is preferably an aperture in the outer wall, but can alternatively be any other suitable access point. The access point is preferably removably sealable with a door or cover, but can alternatively remain open or have any other suitable configuration. The baseboard mounting portion preferably opposes the access point (e.g., is radially aligned with the access point), but can alternatively be offset from the access point or arranged on the access point cover. However, the shell 230 can include any other suitable baseboard mounting point. The baseboard 110 and/or LCM components can additionally or alternatively be positioned and/or oriented in relation to components of the lighting assembly 200, such as in any manner analogous to those disclosed in U.S. application Ser. No. 14/843,828 filed 2 Sep. 2015, which is herein incorporated in its entirety by this reference.

The first and the second regions (111, 112) are preferably of a rectangular shape, but can be of any other suitable shape. The baseboard profile can be circular, polygonal, irregular, or be any other suitable shape. The baseboard 110 can be substantially flat (planar), curved (e.g., concave, convex, semi-spherical, etc.), polygonal (e.g., cylindrical, cuboidal, pyramidal, octagonal, etc.), or have any other suitable configuration. The baseboard 110 preferably encompasses area dimensions substantially less than the dimensions of the lighting assembly 200 (e.g., less than 15×30 mm), and the overall LCM 100 preferably encompasses area dimensions similar to those of the baseboard 110. However, the baseboard 110 and the LCM 100 can possess any suitable dimensions to perform their corresponding functions. The baseboard 110 can be constructed with materials such as laminates, copper-clad laminates, resin impregnated B-stage cloth, copper foil, or any other suitable materials to provide support and electrical connectivity to the LCM components. The baseboard 110 materials can provide rigidity, flexibility, thermal conductivity, thermal insulation, electrical conductivity, electrical insulation, or any other suitable characteristic.

The baseboard 110 can include one or more pins that function as electrical connectors. The one or more pins preferably include power supply pins to facilitate the powering of the LCM components from a voltage rail supplied by the power supply. The one or more pins can also include pins for transmitting data, receiving data, testing LCM components and/or functionality, ground, resetting, pulse width modulation (PWM) signal output, and/or any other suitable pin. Alternatively, the baseboard 110 can exclude pins and instead provide analogous functionality through other suitable means.

In one variation, as shown in FIG. 1, the baseboard 110 can include a lighting driver enable pin 118 (e.g., an LED driver enable pin) that functions to start or cease power provision to the lighting assembly 200. The lighting driver enable pin 118 is preferably configured to output a lighting driver enable or disable signal to the lighting driver module 220 for enabling or disabling power provision to the lighting assembly 200. The lighting driver enable pin 118 preferably aids in managing power provision to the lighting assembly 200. For example, the processor 134 can detect an idle state of the lighting mode output submodule 140, and in response, the processor 134 can control the lighting driver enable pin 118 to output a disable signal for disconnecting power provision to the lighting assembly 200 and decreasing quiescent current draw.

2.2 Communication Submodule.

The LCM 100 can include a communication submodule 120 that functions to communicate data to and/or from the LCM 100. The communication submodule 120 preferably includes a receiver and can additionally include a transmitter. The communication submodule 120 is preferably a wireless communication submodule 120, such as a Zigbee, Z-wave, or WiFi chip, but can alternatively be a short-range communication submodule 120, such as Bluetooth, BLE beacon, RF, IR, or any other suitable short-range communication submodule 120, a wired communication submodule 120, such as Ethernet or powerline communication, or any other suitable communication module 120. For example, the communication submodule 120 can be a WiFi submodule for radio communication by WiFi protocols. The WiFi submodule can include wireless radio chipsets operating on a 802.11 (e.g., 802.11 b/g/n) or 802.15.4 range. The communication submodule 120 can broadcast wireless access points with associated identifiers (e.g., a service set identifier (SSID)), but any other suitable LCM component can additionally or alternatively facilitate the broadcasting of a wireless access point for devices associated with users 300 or providers 400 to access.

The communication submodule 120 can receive radio signals and convert the radio signals into machine readable data for transmission to the control submodule 130. For example, the communication submodule 120 can receive a wireless signal from a user device 305 or an antenna 150 communicably coupled with the user device 305, where the wireless signal indicates a user lighting preference (e.g., color temperature, color mixing, hue, saturation, brightness, choice of bulb, choice of LED string, scene selection, etc.) provided by the user 300. The communication submodule 120 can then convert the wireless signal into machine readable data indicating the lighting preference of the user 300, and transmit the machine readable data to the control submodule 130 through a communication interface such as a bus (e.g., parallel bus, serial bus). Similarly, the communication submodule 120 can receive machine readable data from the control submodule 130 and convert the machine readable data into radio signals for transmission to a wireless device (e.g., a user device 305, a provider device 405, a lighting assembly 200, etc.). For example, the communication submodule 120 can receive machine readable data from the control submodule 130, where the machine readable data indicates a power usage of the lighting assembly 200 under the current lighting preference. The communication submodule 120 can convert the machine readable data to a radio signal for transmission to a wireless device (e.g., a user device 305, a provider device 405, a lighting assembly 200, etc.) to display through an application on the device. However, the communication submodule 120 can receive, convert, and/or transmit any type of suitable signal or data to any suitable component or device.

The communication submodule 120 can also receive user signals indicating a power preference 310 (e.g., average power consumption of a lighting assembly 200, maximum power consumption, etc.), a timing preference 310 (e.g., dim the lighting assembly 200 at 10:00 PM), an event preference 310 (e.g., turn on the light assembly at sunset, turn off the lights if the lighting assembly 200 sensor does not detect movement for 30 minutes), and/or any other suitable user preference 310 for controlling the lighting assembly 200. The user preferences 310 can additionally or alternatively pertain to multiple LCMs 100 and/or multiple lighting assemblies 200. For example, a user preference 310 can be transmitted to a communication submodule 120 of a first LCM 100, and the first LCM 100 can transmit the user preference 310 to other communication submodules 120 of other LCMs 100. However, the user preferences 310 can apply to any combination of LCMs 100, lighting assemblies, and/or suitable components of LCMs 100 and lighting assemblies 200. The user device 305 is preferably a mobile device (e.g., a smartphone), but can alternatively be a laptop, tablet, or any other suitable computing device. The user device 305 preferably includes a user input (e.g., a keyboard, touchscreen, microphone etc.), a user output (e.g., a display, such as an OLED, LED, plasma, or other digital display, a light, a speaker, etc.), a processor, and a data transmitter (e.g., complimentary to the data receiver of the lighting assembly 200). The user device 305 can additionally include a set of sensors, such as an ambient light sensor, a position sensor (e.g., GPS sensor), an image sensor (e.g., camera), an audio sensor (e.g., microphone), or any other suitable sensor or component.

The communication submodule 120 is preferably mounted to the baseboard 110 at an area of the first region 111 that is substantially proximal to the second region 112. Alternatively, the communication submodule 120 can be physically connected to the baseboard 110 at any suitable area of any suitable region of the baseboard 110. However, the communication submodule 120 can additionally or alternatively be wirelessly coupled to the baseboard 110 and/or components mounted on the baseboard 110. The communication submodule 120 can also not be linked with the baseboard 110. The communication submodule 120 preferably receives power through the voltage rail supplied from the power supply and directed through the power supply pin of the baseboard 110. Alternatively, the communication submodule 120 can receive power through a power storage system 170 and/or any other suitable component.

The LCM 100 can include one or more communication submodules 120. In variants including multiple communication modules 120 (e.g., such that the lighting assembly is a multiradio assembly), each communication submodule 120 can be substantially similar (e.g., run the same protocol), or be different. In a specific example, a first communication submodule 120 can communicate with a remote router, while a second communication submodule 120 functions as a border router for devices within a predetermined connection distance. The multiple communication submodules 120 can operate independently and/or be incapable of communicating with other communication submodules 102 of the same LCM 100, or can operate based on another communication submodule 120 of the LCM 100 (e.g., based on the operation state of, information communicated by, or other operation-associated variable of a second communication module). However, the LCM 100 can include any suitable number of communication submodules 120 connected and/or associated in any other suitable manner.

The communication submodule 120 can additionally or alternatively include a router (e.g., a WiFi router), an extender for one or more communication protocols, a communication protocol translator, or include any other suitable communication submodule 120. The communication submodule 120 can also additionally or alternatively include or be communicatively coupled to RAMs, ROMs, flash memory, EEPROMs, optical devices (CD or DVD), hard drives, floppy drives, and/or any suitable data storage device. Further, the communication submodule 120 can additionally or alternatively include or be coupled to an oscillator for converting direct current from a power supply to an alternating current signal for use as a source of energy. The communication submodule 120 can additionally or alternatively include or be coupled to any other suitable component (e.g., an inductor, a bus, an antenna 150, etc.) for facilitating the operation of the communication submodule 120. Examples of buses include parallel buses and serial buses.

2.2 Control Submodule.

The control submodule 130 of the LCM 100 functions to generate instructions 135 for controlling lighting assembly 200 operation based on user preferences 310 received from a user device 305. The control submodule 130 can include a processor 134 and a corresponding storage component 132 (e.g., RAMs, ROMs, flash memory, EEPROMs, optical devices (CD or DVD), hard drives, floppy drives, etc.). The control submodule 130 preferably includes a microcontroller. Alternatively, the control submodule 170 can include any suitable general purpose processing subsystem, which can include any one or more of: a central processing unit (CPU), a microprocessor, a digital signal processor (DSP), a microcontroller, a cloud-based computing system, a remote server, a state machine, an application-specific integrated circuit (ASIC), a programmable logic device (PLD), a field programmable gate array (FPGA), a graphics processing unit (GPU), any other suitable processing device, and any suitable combination of processing devices (e.g., a combination of a DSP and a microprocessor, a combination of multiple microprocessors, etc. Preferably, the control submodule 130 is physically mounted to the first region 111 of the baseboard 110 at an area adjacent the communication submodule 120. Alternatively, the control submodule 130 can be physically positioned at any suitable area of any region of the baseboard 110. However, the control submodule 130 can be wirelessly coupled with the baseboard 110 or not linked to the baseboard 110. The control submodule 130 is preferably communicably coupled with the communication submodule 120 in order to receive or transmit data indicating user preferences 310, firmware configuration parameters 410, hardware data, firmware data, lighting assembly 200 characteristics, and/or any other suitable type of information. The control submodule 130 is also preferably communicably coupled to the lighting mode output submodule 140 in order to facilitate output of lighting mode instructions 135 for driving a lighting driver module 220 controlling a lighting assembly 200. Additionally or alternatively, the control submodule 130 can be connected with hardware accessories (e.g., authentication coprocessors, etc.) for facilitating the authentication and use of other technology. However, the control submodule 130 can additionally or alternatively be connected to an oscillator, the power storage system 170, baseboard 110, sensors, and/or any other suitable component.

2.2.1 Storage Component.

The storage component 132 of the control submodule 130 functions to store information for use by the processor 134 of the control submodule 130. The storage component 132 is preferably non-volatile memory (e.g. EEPROM, EPROM, PROM, Mask Rom, Flash memory, mechanical non-volatile memory, etc.) but can also be volatile memory (e.g., DRAM, SRAM). Alternatively, the storage component 132 can be a remote storage component 132 (e.g., cloud storage). However, the storage component 132 can be any suitable type of component for storing information that can be used by the processor 134. The storage component 132 can be external from the control submodule 130, but the control submodule 130 can also include the storage device. Alternatively, the control submodule 130 can include multiple storage components 132 of the same or differing types. However, the storage component 132 can possess any type of suitable relationship with the control submodule 130 for storing information for use by the processor 134.

Figure 9:
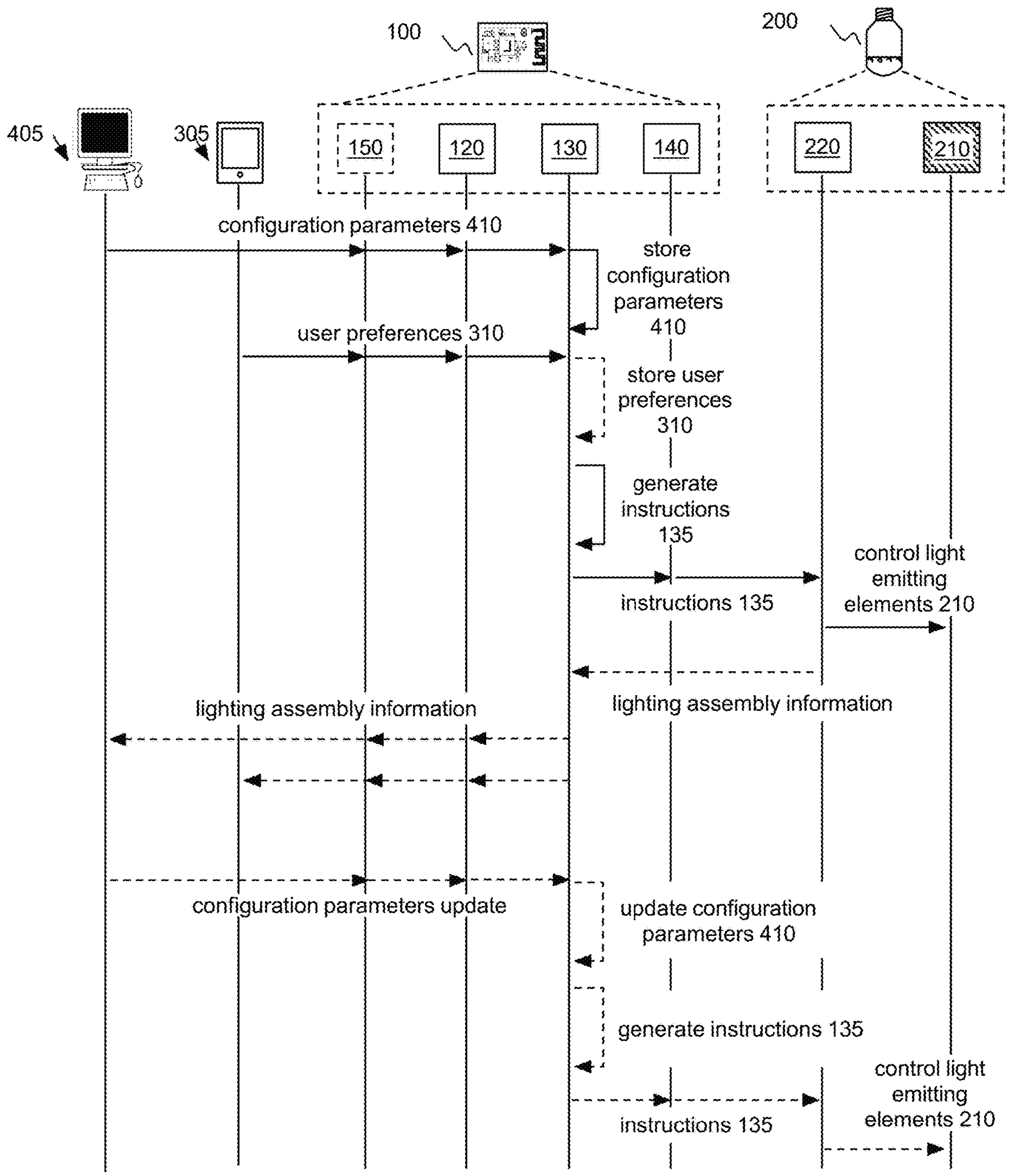
FIG. 9 is a schematic representation of a second variation of the lighting connectivity module.

The storage component 132 preferably stores a configuration file containing configuration parameters 410 for operation of the LCM 100 and the corresponding lighting driver module 220 and lighting assembly 200. However, the configuration parameters 410 for operation of the LCM 100 and corresponding systems can be stored and/or executed in any other suitable manner. The configuration parameters 410 can include lighting parameters (e.g., minimum and maximum signal frequency for the lighting mode output transmitted to the lighting driver module 220, maximum output brightness of the lighting assembly 200, color temperature for different lighting components of the lighting assembly 200, etc.) for the lighting driver module 220 and the lighting assembly 200, power parameters (e.g., minimum time delay between power on and boot, quiescent power draw, maximum lighting assembly 200 power draw, etc.), product information parameters (e.g., product name, country-code language, product description, product manufacturer, model name, manufacture date, hardware version, support resources, SSIDs, passphrases, application names, etc.), lighting assembly 200 information (e.g., vendor ID, bulb type, lamp type, base type, beam angle, dimming, color, variable color temperature, effects, minimum and maximum voltage, wattage (e.g., at full brightness, of an analogous traditional incandescent bulb), minimum and maximum temperature, color rendering index, etc.), and/or any other suitable type of parameter or information. The configuration parameters 410 are preferably determined by a provider 400 (e.g., an original equipment manufacturer, a third-party manufacturer, etc.) but can be determined by any other suitable entity. The configuration parameters 410 are preferably provided wirelessly. For example, a provider device 405 can transmit configuration radio signals indicating configuration parameters 410 to an antenna 150 or external connector 154 (e.g., radiofrequency connector) of the LCM 100. The communication submodule 120 can convert the received radio signals into machine readable data and transmit the data to the control submodule 130, which then stores the configuration parameters 410 at the storage component 132 for subsequent use by the processor 134. Alternatively, the configuration parameters 410 can be programmed directly into the storage device (e.g., through Serial Wire Debug (SWD), universal asynchronous receiver-transmitter (UART), etc.). As shown in FIG. 9, the provider 400 can update configuration parameters 410 that are already stored by the storage component 132. For example, the communication submodule 120 can receive a configuration update signal transmitted wirelessly by the provider 400. The communication submodule 120 can subsequently convert the configuration update signal into machine readable data indicating a configuration parameter update. The storage component 132 can then update the lighting parameter based on the lighting parameter update. The configuration parameters 410 can additionally or alternatively pertain to multiple LCMs 100 and/or multiple lighting assemblies 200. For example, a configuration parameter 410 can be transmitted to a communication submodule 120 of a first LCM, and the first LCM 100 can transmit the configuration parameter 410 to other communication submodules 120 of other LCMs 100 for storage in storage components 132 of other LCMs 100. However, the configuration parameters 410 can apply to any combination and/or number of LCMs 100, lighting assemblies, and/or suitable components of LCMs 100 and lighting assemblies. Further, the configuration parameters 410 can be stored at any suitable combination and/or number of storage components 132. The storage component 132 can additionally store security keys (e.g., public and/or private certificates) or store any other suitable information.

2.2.2 Processor.

The processor 134 of the control submodule 130 functions to control the operation of the LCM components and the lighting assembly 200. The processor 134 can generate lighting driver instructions 135 for the lighting driver module 220 to implement with the light emitting elements 210 of the lighting assembly 200. The processor 134 preferably drives the lighting driver module 220 with lighting driver instructions 135 for controlling pulse rate of the light emitting elements 210 (e.g., by controlling the PWM rate of the LED), but can alternatively control power provision and/or communicate information to the lighting driver module 220 by controlling the current provided to the lighting emitting elements or controlling any other suitable parameter of the power provided to the light emitting elements 210. The generated lighting driver instructions 135 are preferably transmitted to the lighting driver module 220 through the lighting mode output submodule 140. Alternatively, the control submodule 130 and/or any other suitable component can transmit the lighting driver instructions 135 to the lighting driver module 220 for implementation with the light emitting elements 210. The processor 134 preferably executes firmware associated with the LCM 100 in generating the lighting driver instructions 135. The firmware is preferably updatable wirelessly (e.g., over-the-air (OTA) updates), but can alternatively be updated in a wired or physical manner. Alternatively, the firmware can be substantially static and uneditable. The firmware is also preferably configurable by the provider 400 through configuration parameters 410 provided by the provider 400. Firmware configuration settings can be directly programmed by the provider 400 or provided wirelessly through transmission by a device (e.g., a smartphone, laptop, tablet, smart TV, and/or any other suitable computing device) associated with the provider 400. The firmware preferably supports lighting calibration, color compensation, as well as thermal and brightness management with respect to the light emitting elements 210 of the lighting assembly 200. However, the firmware can support any other suitable calibration or management techniques in controlling the LCM components or the lighting assembly 200. Alternatively, the processor 134 can generate lighting driver instructions 135 and/or manage the LCM 100 and lighting assembly 200 without firmware configuration settings provided by a provider 400 or without executing firmware associated with the LCM 100.

In a first variation, the processor 134 generates the lighting driver instructions 135 based on the user preference 310 transmitted by the user device 305 (e.g., a smartphone, laptop, tablet, smart TV, and/or any other suitable computing device) associated with the user 300. For example, a user 300 can wirelessly transmit a radio signal indicating a user preference 310 of a desired lighting assembly color temperature of 4200K. The communication submodule 120 can convert the radio signal into machine readable data indicating the desired lighting assembly color temperature. The processor 134 can subsequently generate lighting driver instructions 135 that direct, through appropriate power provision, the lighting driver module 220 to control the light emitting elements 210 to emit light at the color temperature of 4200K desired by the user 300.

In a second variation, the processor 134 can generate lighting driver instructions 135 based on the configuration parameters 410 provided by the provider 400. For example, if a provider 400 wirelessly provides a power configuration parameter of 10,000 mW as the maximum power allowed to be consumed by the lighting assembly 200, then the processor 134 will generate lighting driver instructions 135 for controlling the power provision to the lighting assembly 200 to be up to or less than 10000 mW.

In a third variation, the processor 134 can generate lighting driver instructions 135 based on the user preferences 310 while accommodating constraints established by the configuration parameters 410 provided by the provider 400. In a first example of the third variation, based on the type of light assembly that a provider 400 is using with the LCM 100, the provider 400 can provide a configuration parameter 410 indicating a maximum brightness level (e.g., in terms of maximum power consumption to achieve the maximum brightness level) for the light emitting elements 210 of the lighting assembly 200. The storage component 132 of the control submodule 130 can store the configuration parameter 410 provided by the provider 400. Additionally, the user device 305 can transmit a user preference 310 for the light emitting elements 210 to emit light at a certain brightness level. The processor 134 can then execute firmware for generating the lighting driver instructions 135 based on mapping the user brightness level preference to a brightness level equal to or less than the maximum brightness level indicated by the provider configuration parameter 410. In a second example of the third variation, the processor 134 will only generate lighting driver instructions 135 for output if the LCM 100 has received user preferences 310 as well as provider configuration parameters 410. In the second example, the processor 134 will execute firmware for generating the lighting driver instructions 135 in response to the control submodule 130 receiving a provider lighting parameter and a provider power parameter, the storage component 132 storing the lighting parameter and the power parameter, and the control submodule 130 receiving a user lighting preference 310.

The processor 134 also preferably controls power provision to the LCM components. The processor 134 preferably controls power provision in accordance with the power configuration parameters provided by the provider 400 (e.g., an original equipment manufacturer, a third-party manufacturer, etc.). For example, based on a power configuration parameter, the processor 134 can control the amount of quiescent power draw when the LCM 100 is in an idle state. However, any other suitable component or combination of components can control power provision to the LCM components. The processor 134 can additionally function to record lighting assembly data and send the lighting assembly data to a device. The processor 134 can additionally include a power conversion module that functions to convert power source power to power suitable for lighting assembly 200. The power conversion module can be a voltage converter, power conditioning circuit, or any other suitable circuit. However, the processor 134 can additionally or alternatively include any other suitable component for controlling the operation of the LCM components and the lighting assembly 200.

The processor 134 can additionally or alternatively control the lighting assembly 200 in any manner analogous to those disclosed in U.S. application Ser. No. 14/720,180 filed 22 May 2015 and U.S. application Ser. No. 14/843,828 filed 2 Sep. 2015, which are herein incorporated in their entirety by this reference.

2.3 Lighting Mode Output Submodule.

The lighting mode output submodule 140 functions to communicate instructions 135 to the lighting assembly 200 for controlling the light emitting elements 210. The lighting mode output submodule 140 is preferably positioned at the first region 111 of the baseboard 110 (e.g. lighting mode output pins extending from the first region 111 of the baseboard 110). In one variation, the lighting mode output submodule 140 is arranged along an edge of the baseboard opposing the antenna. For example, when the lighting mode output submodule 140 includes pins, the pins can extend beyond a baseboard edge opposing the antenna. In a second variation, the lighting mode output submodule 140 is arranged along a baseboard face opposing the communications module and/or processing module. For example, when the lighting mode output submodule 140 includes pins, the pins can be arranged normal to the baseboard broad face. However, the lighting mode output submodule 140 can be physically positioned at any suitable region of the baseboard 110, and positioned in any suitable arrangement (e.g., normal, at an angle to, adjacent, etc.) relative to the remainder of the LCM components. Alternatively, the lighting mode output submodule 140 can be independent from the baseboard 110 and communicate with LCM components wirelessly, remotely, and/or in any other suitable manner.

The lighting mode output submodule 140 is preferably electrically connected to the lighting driver module 220 of the lighting assembly 200 (e.g., through output pins extending from a PCB 110) in order to control the light emitting elements 210 through the lighting driver module 220. Alternatively, the lighting mode output submodule 140 can directly control the light emitting elements 210. However, the lighting mode output submodule 140 can communicate with the lighting driver module 220 and/or other components of the lighting assembly 200 wirelessly, remotely, and/or in any other suitable manner. The lighting mode output submodule 140 preferably outputs the lighting driver instructions 135 generated by the processor 134. Alternatively, the lighting mode output submodule 140 can further process the lighting driver instructions 135 before outputting instructions 135 to the lighting driver module 220. However, the lighting mode output submodule 140 can output any suitable signal or data for instructing the lighting driver module 220 to control the light emitting elements 210 of the lighting assembly 200.

In a first variation, the lighting mode output submodule 140 includes a processor that outputs instructions 135 that include PWM signals. The output is oscillating, instructing the lighting driver module 220 to repeatedly turn the light emitting elements 210 on and off through a pulsed voltage. The outputted PWM signals can vary in the width of the pulses as well as the space between the pulses. The instructions 135 outputted by the lighting mode output submodule 140 can control the pulses in accordance with a duty cycle, which can represent the percentage of time during a cycle that the light emitting elements 210 are turned on. For example, a duty cycle of 75% can indicate that the pulses will be modulated to turn the light emitting elements 210 on for 75% of the cycle of the pulses. The frequencies of the PWM signals are preferably configurable by the configuration parameters 410 provided by the provider 400 (e.g., an original equipment manufacturer, a third-party manufacturer, etc.). For example, a provider 400 can provide a minimum and a maximum frequency for the PWM signals outputted by the lighting mode output submodule 140. However, the lighting mode output submodule 140 can output instructions 135 that do not include PWM signals, but still possess analogous characteristics (e.g., a frequency, duty cycle, etc.).

As shown in FIG. 1, in a second variation, the lighting mode output submodule 140 includes a lighting mode output pin 142. The lighting mode output pin 142 preferably extends from the baseboard 110, but can be positioned at any other suitable location. The lighting mode output pin 142 is preferably configured to output a PWM signal to instruct the lighting driver module 220, but can additionally or alternatively output any other suitable form of instructions 135 to the lighting driver module 220. The outputted instructions 135 can include a logic signal, operating at a particular voltage (e.g., 3.3 V), which indicates a logic level state that the signal is in. For example, the logic signal can be in state "A," which indicates to the lighting driver module 220 that the desired lighting mode is a "dimmable white" mode for controlling the brightness of a set of light emitting elements 210 of the lighting assembly 200. Depending on the logic level state of the signal, different lighting modes can be enabled, disabled, and/or combined. However, the outputted instructions 135 can indicate a lighting mode for the lighting driver module 220 to implement without using a logic signal.

Figure 10:
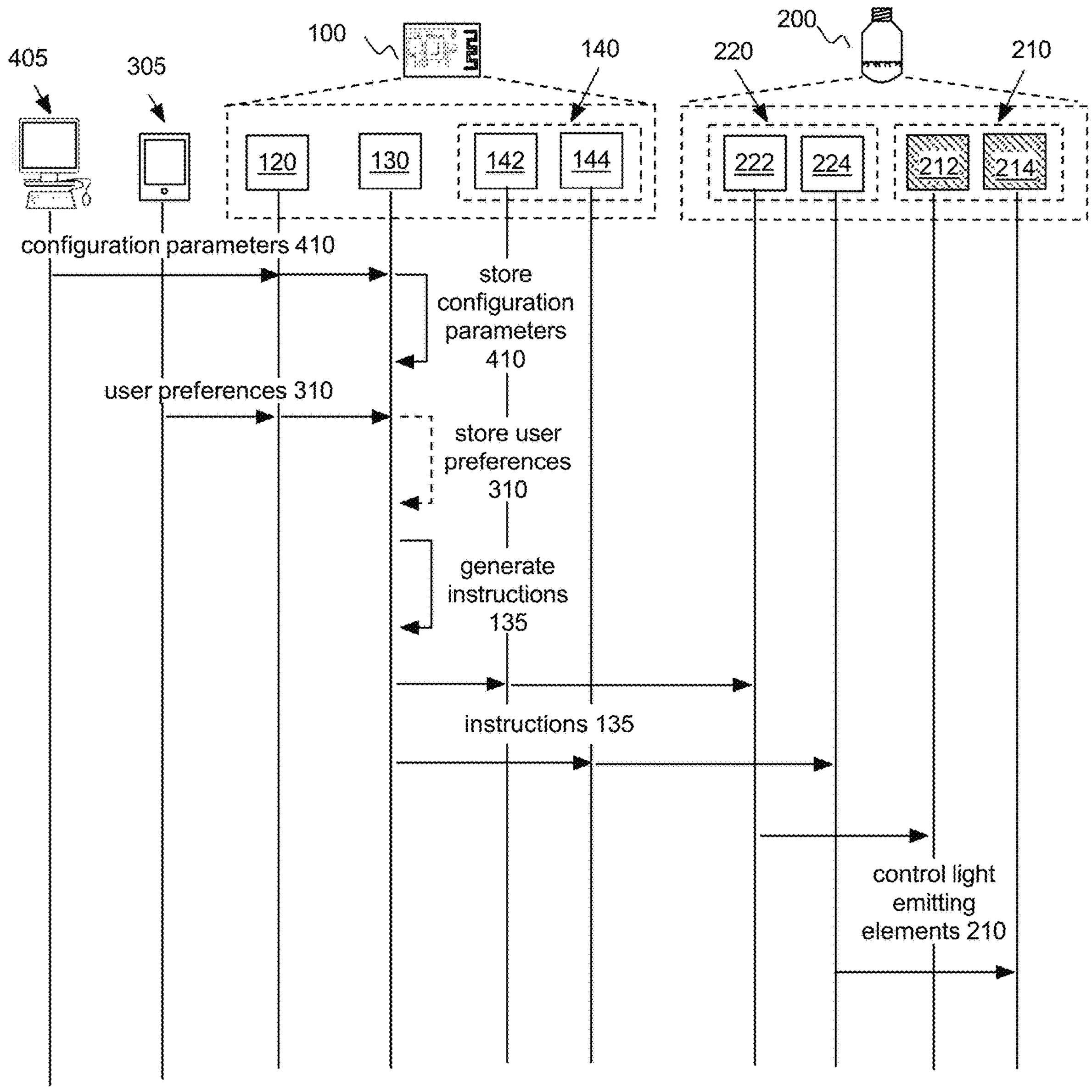
FIG. 10 is a schematic representation of a third variation of the lighting connectivity module.

As shown in FIGS. 1 and 10, in a third variation, the lighting mode output submodule 140 includes a plurality of lighting mode output pins 142, 144. The lighting mode output pins 142, 144 preferably extend from the baseboard 110, but can be positioned at any other suitable configuration. The lighting mode output pins 142, 144 are preferably configured to output different PWM signals to instruct the lighting driver module 220, but can additionally or alternatively output any other suitable form of instructions 135 in combination or to the exclusion of the PWM signals. The outputted instructions 135 can include logic signals for indicating a particular lighting mode or modes for the lighting assembly 200 to implement.

As shown in FIG. 10, in a first example of the third variation, the lighting mode output submodule 140 includes a first and a second lighting mode output pin (142, 144), which can be used to output signals for selectively powering different sets of light emitting elements out of the light emitting elements 210 of the lighting assembly 200. In the first example, the first lighting mode output pin 142 is configured to output a signal that disables the lighting driver module 220 from setting an overall brightness that uses each of the light emitting elements 210 of the lighting assembly 200. The second lighting mode output pin 144 is configured to output a signal that selects a specific set of light emitting elements 210 from the plurality to receive current from the lighting driver module output. In a specific example, the first lighting mode output pin 142 controls the operation mode of the population of light emitting elements as a whole, while the second lighting mode output pin 144 controls the operation of specific subsets of light emitting elements. The configuration enables a user 300 to configure which light emitting elements 210 are utilized in order to obtain a lighting environment in accordance with the user's preferences 310.

As shown in FIG. 10, in a second example of the third variation, the lighting mode output submodule 140 includes a first and a second lighting mode output pin (142, 144) configured to generate output signals that respectively control a first and a second lighting driver (222, 224) of a lighting driver module 220, where the first 222 and the second 224 lighting driver control different sets of light emitting elements 210 of the lighting assembly 200. A provider 400 can provide configuration parameters 410 that differentially control the first and the second lighting drivers (222, 224). In an illustration of the second example, the provider 400 can provide configuration parameters 410 that specify a first maximum power usage parameter for implementation by the first lighting driver 222, and a second maximum power usage for implementation by the second lighting driver 224. Thus, the provider 400 can differentially control the power provision to different sets of light emitting elements 210 of the same lighting assembly 200. In another illustration of the second example, a user 300 can provide user preferences 310 for specifying a first and a second color to be emitted by a first and a second set of light emitting elements (212, 214), respectively. In this illustration, the processor 134 generates lighting driver instructions 135 based on the user preferences 310, and the first 142 and the second 142 lighting mode output pins output the corresponding lighting driver instructions 135 to drive the first 222 and the second 224 lighting drivers of the lighting driver module 220. The first lighting driver 222 controls the first set of light emitting elements 212 to emit the first color, and the second lighting driver 224 controls the second set of light emitting elements 214 to emit the second color.

The lighting assembly 200 can also be controlled in any manner. In some variants, the lighting assembly 200 can be controlled through the processes disclosed in U.S. application Ser. No. 14/720,180 filed 22 May 2015 and U.S. application Ser. No. 14/843,828 filed 2 Sep. 2015, which are herein incorporated in their entirety by this reference.

2.4 Antenna.

As shown in FIGS. 1 and 6-9, the LCM 100 can additionally or alternatively include an antenna 150 that functions as a transceiver for radio signals transmitted to or received from devices associated with users 300 or providers 400. Preferably, the LCM 100 includes one antenna 150, but can alternatively include any number of antennas 150 in relation to any number of LCMs 100. The antenna 150 is preferably communicably coupled to the communication submodule 120 in order to transmit or receive signals from the communication submodule 120. The antenna 150 can receive radio signals from user devices 305, where the radio signals indicate user preferences 310 (e.g., lighting preferences 310, power preferences 310, timing preferences 310, event preferences 310, etc.) provided by the user 3000 through, for example, an application on the user device 305. For example, the antenna 150 can receive a radio signal indicating a user preference 310 for a lighting environment that represents a "sunset scene." The antenna 150 can subsequently process the radio signal and/or transmit the radio signal to the communication submodule 120. The antenna 150 can also receive radio signals from devices associated with a provider 400, where the radio signals indicate configuration parameters 410 provided by the provider 400 for controlling the LCM components or the lighting assembly 200. However, any other suitable LCM component can receive radio signals from devices associated with users 300 or providers 400. Preferably, the antenna 150 transmits radio signals to devices associated with users 300 or providers 400, where the radio signals indicate information regarding the LCM components or the lighting assembly 200. The information can include product information (e.g., product name, country-code language, product description, product manufacturer, model name, manufacture date, hardware version, support resources, SSIDs, passphrases, application names, etc.), lighting status information (e.g., current power consumption of the lighting assembly 200, total power consumption over time of the LCM 100, brightness level, color temperature, etc.) and/or any other suitable type of information to transmit to devices associated with users 300 or providers 400. The information transmitted to the devices can be configured by the provider 400 and/or the user 3000. For example, the provider 400 can provide configuration parameters 410 specifying the type of product information that is displayed to the user through an application on the user device 305. In another example, the user 300 can set notifications to display through the application on the user device 305 for different lighting statuses (e.g., if the average power consumption of the lighting assembly 200 exceeds a certain threshold). However, any suitable entity can configure the information transmitted to devices associated with users 300 or providers 400, and any suitable LCM component can transmit the information to the devices.

The antenna 150 is preferably positioned at the second region 112 of the baseboard 110, but can be positioned at any other region or combination of regions of the baseboard 110. The lighting mode output submodule 140 is preferably positioned proximal to a first end of the baseboard 110, and the antenna 150 is preferably positioned proximal to a second end of the baseboard 110, and the first and second ends of the baseboard 110 are preferably opposite ends. The first end of the baseboard is preferably an end (e.g., edge, side, region proximal the edge or side, etc.) of the first region 111, but can alternatively be an end of the second region or any other suitable portion of the baseboard. The second end of the baseboard is preferably an end (e.g., edge, side, region proximal the edge or side, etc.) of the second region 112, but can alternatively be an end of the second region or any other suitable portion of the baseboard. However, the antenna 150 can be arranged along the first end of the baseboard, a portion of the baseboard between the first and second ends, along any other suitable portion of the baseboard, or otherwise arranged relative to the baseboard.

When the lighting assembly 200 is assembled, the antenna 150 preferably extends beyond the shell 230 to enable better signal reception and/or reduce signal interference by the housing material, but can alternatively be partially or entirely encapsulated within the shell 230. The antenna 150 can additionally extend through a diffuser, or can be enclosed by the diffuser. The antenna 150 preferably extends through antenna apertures in the end cap 228 and/or the lighting assembly 200, but can alternatively extend through a gap between the end cap 228 and/or lighting assembly 200 and shell 230, or extend through any other suitable aperture. As shown in FIG. 12, the end cap 228 of the lighting assembly 200 can include a first antenna aperture 229 through the cap thickness that functions to permit LCM 100 extension therethrough. Alternatively, the antenna 150 can be confined within the shell boundaries by the shell 230 (e.g., by the end cap 228) or by any other suitable component. In this variation, the shell 230, lighting assembly 200, or other enclosing component can function to shield the LCM 100 from external electrical components. The substrate 250 can include a second antenna aperture 252. When the lighting assembly 200 is assembled, the antenna 150 can extend through the first and second antenna apertures. However, the antenna 150 can also be positioned and/or oriented in any manner with respect to any suitable component.

In relation to the antenna's 150 positioning and/or orientation with respect to the LCM components and/or the lighting assembly 200, the antenna 150 can be positioned and/or oriented in any manner analogous to those disclosed in U.S. application Ser. No. 14/512,669 filed 13 Oct. 2014 or U.S. application Ser. No. 14/843,828 filed 2 Sep. 2015, which are herein incorporated in their entirety by this reference.

Figure 6:
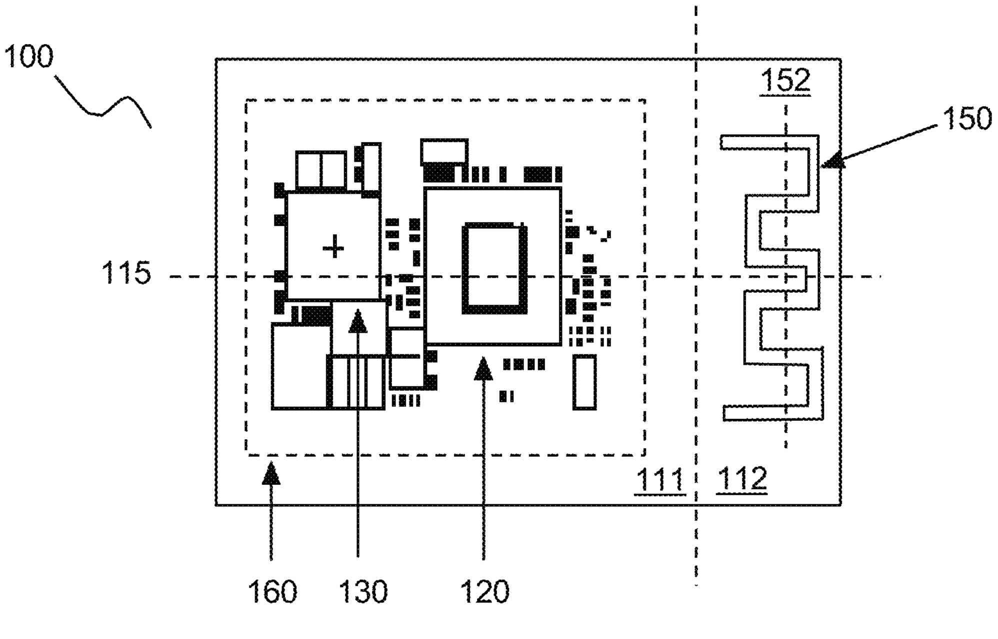
FIGS. 6, 7, and 8 are schematic representations of a first, second, and third variation of the antenna, respectively.
Figure 7:
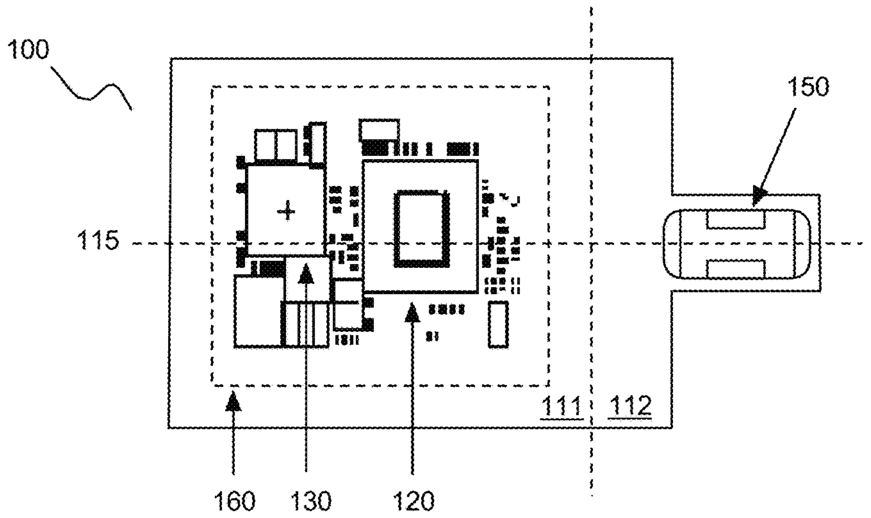
Figure 8:
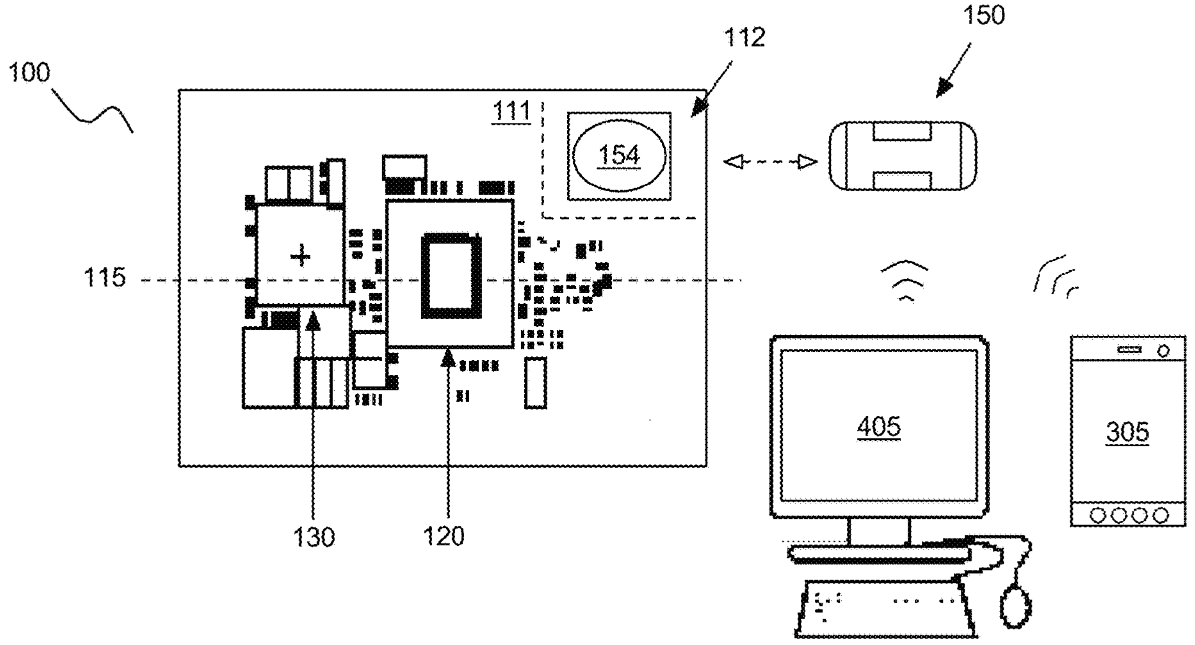

As shown in FIG. 6, in a first variation, the antenna 150 is a PCB trace antenna 150 with the trace pattern integrated with the second region 112 of the baseboard 110. However, the PCB trace antenna 150 can be integrated with any other region or combination of regions of the baseboard 110, or be integrated with a different component of the LCM 100. The trace pattern preferably forms a boustrophedon pattern, but can alternatively or additionally form a serpentine pattern, spiral pattern, or any other suitable pattern for transmitting or receiving signals. The trace pattern preferably includes a longitudinal axis 152 parallel to a length of the trace pattern, and the longitudinal axis 152 is preferably perpendicular to the longitudinal axis 115 of the baseboard 110. However, the trace pattern can be positioned and/or oriented in any suitable relation to the baseboard 110 and/or other components of the LCM 100 or lighting assembly 200. The PCB trace antenna can be connected to the communication module, processor, or any other suitable component by a set of traces embedded within the baseboard 110, but can alternatively be connected by a set of wires or otherwise connected to the LCM components. As shown in FIG. 7, in a second variation, the antenna 150 is a chip antenna (e.g., a ceramic chip antenna) preferably mounted to the second region 112 of the baseboard 110. The chip antenna can be connected to one or more of the remainder LCM components by: traces, wires, connectors (e.g., pin connectors), or any other suitable connection. As shown in FIG. 8, in a third variation, the antenna 150 is external to the baseboard 110 and LCM components associated with the baseboard 110. For example, the antenna 150 can be an external antenna associated with an external connector 154 (e.g., a radiofrequency connector, connector jack, etc.) mounted to the second region 112 of the baseboard 110. In a second example, the antenna 150 can be mounted to the lighting assembly 100 and electrically connected to the LCM by a wired connector. However, the external connector can be positioned and/or oriented in any suitable manner with respect to the baseboard and/or any suitable component of the LCM 100 or lighting assembly 200.

2.5 Housing.

As shown in FIGS. 6, and 7, the LCM 100 can include a housing 160 that functions to provide shielding to components of the LCM 100. Preferably, the housing 160 provides mechanical protection to the baseboard 110, the LCM components contained in the housing 160, the LCM components proximal to the housing 160, and/or any other suitable LCM 100 or lighting assembly component. The housing 160 also preferably provides electromagnetic shielding to the LCM components contained within the housing 160 (e.g., functions as an electromagnetic shield). The housing 160 can additionally function as a thermal conductor for the encapsulated LCM components. For example, the housing can be thermally conductive, and be configured to a lighting assembly heat sink (e.g., the lighting assembly housing). Alternatively, the housing 160 can be thermally insulative, and thermally insulate the encapsulated LCM components from heat generated by auxiliary lighting assembly components. However, the housing 160 can possess any other suitable characteristic or provide any other suitable type of protection to the LCM 100 or lighting assembly components. The housing can be made of metal (e.g., ferrous, non-ferrous, etc.), ceramic, plastic, or any other suitable material. The housing can include metallic coatings or any other suitable treatment.

The housing 160 is preferably mounted to the first region 111 of the baseboard 110 and not the second region 112 (e.g., extends over the first region 111 only), but can alternatively extend over only the second region 112, extend over all or a portion of the first and second regions, or be otherwise positioned in relation to the baseboard 110 and/or the LCM components. The housing 160 preferably cooperatively encloses the communication submodule 120 and the control submodule 130 with the baseboard 110, at the exclusion of an antenna 150 of the LCM 100. Alternatively, the housing 160 can contain or not contain any suitable component of the LCM 100 or lighting assembly 200. The housing profile can be circular, polygonal, irregular, or be any other suitable shape. The housing 160 can be substantially flat (planar), curved (e.g., concave, convex, semi-spherical, etc.), polygonal (e.g., cylindrical, cuboidal, pyramidal, octagonal, etc.), or have any other suitable configuration. The housing 160 can be rigid, flexible, or have any other suitable material property. The housing 160 can be made of plastic, metal, ceramic, or any other suitable material.

2.6 Sensor.

As shown in FIG. 1, the LCM 100 can additionally include a set of sensors 180 that function to measure ambient environment parameters, system parameters, or any other suitable parameter. These measurement values can be used to adjust light emitting element 200 operation (e.g., adjust the intensity of emitted light, the color temperature of emitted light, turn the elements on or off, etc.), change communicated control information, interpret control information, or be used in any other suitable manner. The sensor operation can be configured based on configuration parameters 410 provided by the provider 400 and/or user preferences 310 provided by the user 300. For example, the user 300 can transmit a user preference 310 to cease power provision to the light emitting elements 210 when a sensor detects a high level of lighting in the environment. The user preference 310 can be implemented in the form of lighting driver instructions 135 based on the user preference 310 and sensor data.

Sensors 180 can include position sensors (e.g., accelerometer, gyroscope, etc.), location sensors (e.g., GPS, cell tower triangulation sensors, triangulation system, trilateration system, etc.), temperature sensors, pressure sensors, light sensors (e.g., camera, CCD, IR sensor, etc.), current sensors, proximity sensors, clocks, touch sensors, vibration sensors, or any other suitable sensor. The sensors 180 can be connected to the processor for transmitting and/or receiving data from the processor 134 and/or communication submodule 120. The sensors 180 can be mounted onto any suitable region of the baseboard 110, but can alternatively be external to the baseboard 110. The sensors can be arranged external the housing 160, but can alternatively be encapsulated within the housing 160. However, the sensors 180 can be positioned and/or oriented in any suitable fashion to any component of the LCM 100 or the lighting assembly 200.

2.7 Power Storage System.

As shown in FIG. 1, the LCM 100 can additionally include a power storage system 170 that functions to store power, provide power, and/or receive power. The power storage system 170 can be electrically connected to the processor 134 of the control submodule 130, power supply (e.g., base), and/or any other suitable LCM components. The power storage system 170 can be arranged within the housing 160, arranged external the housing 160, or arranged in any other suitable position. The power storage system 170 can be physically connected to the baseboard 110 (e.g., mounted to the first region 111 of the baseboard 110), but can also be external to the baseboard 110. The power storage system 170 can be a battery (e.g., a rechargeable secondary battery, such as a lithium chemistry battery; a primary battery), piezoelectric device, or be any other suitable energy storage, generation, or conversion system.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

I claim:

1. A lighting connectivity module comprising:
- a baseboard;
- an antenna connected to the baseboard;
- a wireless communication chipset mounted to the baseboard, the antenna communicably coupled to the wireless communication chipset;
- a microcontroller electrically coupled to the wireless communication chipset, wherein the microcontroller comprises a processor configured to:
  - receive an input from the wireless communication chipset,
  - execute firmware for generating lighting instructions based on the input, and
  - provide an output signal at a processor output contact based on the lighting instructions; and
- an LED driver enable output contact electrically coupled to the microcontroller, wherein the processor is further configured to execute firmware for:
  - determining an idle state of the lighting connectivity module; and
  - controlling an enable output at the LED driver enable output contact based on the idle state of the lighting connectivity module.

2. The lighting connectivity module of claim 1, further comprising:
- a lighting mode output contact coupled to the baseboard; and
- a lighting mode output submodule, the lighting mode output submodule electrically coupled to the processor output contact and to the lighting mode output contact, wherein the lighting mode output submodule is configured to:
- receive the lighting instructions;
- execute firmware for generating LED driver instructions based the lighting instructions; and
- output the LED driver instructions at the lighting mode output contact.

3. The lighting connectivity module of claim 2, wherein the processor is further configured to execute firmware for:
- determining the idle state of the lighting connectivity module by determining an idle state of the lighting mode output submodule; and
- controlling an enable output at the LED driver enable output contact based on the idle state of the lighting mode output submodule.

4. The lighting connectivity module of claim 2, wherein the lighting connectivity module is contained within a housing of an LED assembly, the LED assembly electrically connected to the lighting mode output contact.

5. The lighting connectivity module of claim 2, wherein:
- the baseboard defines a first end and a second end opposing the first end;
- the lighting mode output contact is arranged proximal to the first end; and
- the antenna is arranged proximal to the second end.

6. The lighting connectivity module of claim 1, wherein the antenna is a trace antenna integrated with the baseboard.

7. The lighting connectivity module of claim 6, wherein:
- the trace antenna forms a boustrophedon pattern; and
- a trace pattern longitudinal axis of the boustrophedon pattern is substantially perpendicular to a baseboard longitudinal axis of the baseboard.

8. The lighting connectivity module of claim 1, wherein the antenna comprises an RF connector mounted to the baseboard, the RF connector communicably coupled to the wireless communication chipset.

9. The lighting connectivity module of claim 1, wherein:
- the wireless communication chipset comprises a wireless communication chipset power input;
- the microcontroller further comprises a microcontroller power input; and
- the lighting connectivity module further comprises a power input contact electrically connected to the wireless communication chipset power input and to the microcontroller power input.

10. The lighting connectivity module of claim 1, further comprising an electromagnetic shield mounted to the baseboard, wherein the electromagnetic shield encloses the wireless communication chipset and the microcontroller.

11. The lighting connectivity module of claim 10, wherein the electromagnetic shield does not enclose the antenna.

12. A system comprising:
- a baseboard;
- an antenna connected to the baseboard;
- a microcontroller mounted to the baseboard, the antenna communicably coupled to the microcontroller, wherein the microcontroller comprises:
  - non-volatile memory; and
  - a processor, the processor configured to:
    - execute firmware for generating lighting instructions based on a state of the non-volatile memory and an input received by the antenna, and
    - provide an output signal based on the lighting instructions;
- a lighting mode output submodule mounted to the baseboard, the lighting mode output submodule electrically coupled to the processor, wherein the lighting mode output submodule processor is configured to:
  - receive the output signal from the processor,
  - execute firmware for generating LED driver instructions based on the output signal, and
  - output the LED driver instructions at a lighting mode output contact electrically coupled to the lighting mode output submodule; and an LED driver enable output contact electrically coupled to the microcontroller, wherein the processor is further configured to execute firmware for:

determining an idle state of the lighting mode output submodule; and controlling an enable output at the LED driver enable output contact based on the idle state of the lighting mode output submodule.

13. The system of claim 12, further comprising a wireless communication chipset mounted to the baseboard, the wireless communication chipset communicably coupling the antenna to the microcontroller.

14. The system of claim 12, wherein the system is contained within a housing of an LED assembly, the LED assembly electrically connected to the lighting mode output contact.

15. The system of claim 12, wherein the antenna is a trace antenna integrated with the baseboard.

16. The system of claim 15, wherein the trace antenna defines a boustrophedon pattern.

17. The system of claim 15, wherein:

the baseboard comprises a first region adjacent a second region, a second region longitudinal axis of the second region is substantially perpendicular to a baseboard longitudinal axis of the baseboard, and a trace pattern longitudinal axis defined by the trace antenna is substantially perpendicular to the baseboard longitudinal axis.

18. The system of claim 12, wherein:

the baseboard defines a first end and a second end opposing the first end;

the lighting mode output contact is arranged proximal to the first end; and the antenna is arranged proximal to the second end.

19. The system of claim 12, wherein:

the baseboard comprises a first region adjacent a second region, and a second region longitudinal axis of the second region is substantially perpendicular to a baseboard longitudinal axis of the baseboard.

* * * * *